Dec. 13, 1955   H. R. GREENLEE   2,726,556
HYDRODYNAMIC TRANSMISSION
Filed May 25, 1950   4 Sheets-Sheet 1

INVENTOR.
Harry R. Greenlee.
BY
Harness and Harris
ATTORNEYS.

Dec. 13, 1955  H. R. GREENLEE  2,726,556
HYDRODYNAMIC TRANSMISSION
Filed May 25, 1950  4 Sheets-Sheet 4

INVENTOR.
Harry R. Greenlee.
BY
Harness and Harris
ATTORNEYS

United States Patent Office 2,726,556
Patented Dec. 13, 1955

2,726,556

HYDRODYNAMIC TRANSMISSION

Harry R. Greenlee, Detroit, Mich., assignor to Chrysler Corporation, Highland Park, Mich., a corporation of Delaware Application May 25, 1950, Serial No. 164,119

25 Claims. (Cl. 74—645)

This invention relates to a power transmission unit comprising an infinitely variable hydrokinetic torque converter, a pressure fluid operated master clutch, and a semi-automatic type of change speed gear box, which elements are compactly arranged in a series drive transmitting relationship and provided with novel control means to insure the maximum flexibility and ease of operation for a unit of this general type.

It is a primary object of this invention to provide a power transmission unit including a series arranged torque converter and change speed gear box with hydraulically operated control means therefor that eliminate the need for the conventional, manually operated, clutch pedal.

It is another object of this invention to provide a control system for a transmission of this type that includes an automatically operable no-creep brake device.

It is another object of this invention to provide a change speed power transmission unit wherein the gear ratio selector lever therefor has associated therewith a clutch operating device that is automatically actuated by operation of the gear ratio selector lever.

It is another object of this invention to provide a power transmission unit that includes a hydrokinetic torque converter having a master clutch unit nested interiorly thereof whereby the overall size of the power transmission unit may be greatly reduced, the nesting arrangement also reducing the size of the various converter components.

It is a further object of this invention to provide a combination hydrokinetic torque converter and friction clutch assembly wherein the clutch assembly is nested within the converter in such a manner that both improved converter and clutch operation is obtainable.

It is another object of this invention to provide a pressure fluid accumulator device to cushion hydraulic impact loads in the closed hydraulic control system and to insure an adequate supply of pressure fluid for the hydraulic controls at all times.

Other objects and advantages of this invention will become readily apparent from a reading of the attached specification and a consideration of the related drawings wherein:

Fig. 8 is a fragmentary sectional elevational view of a modified form of converter and master clutch assembly.

Figures 1, 2, 3:
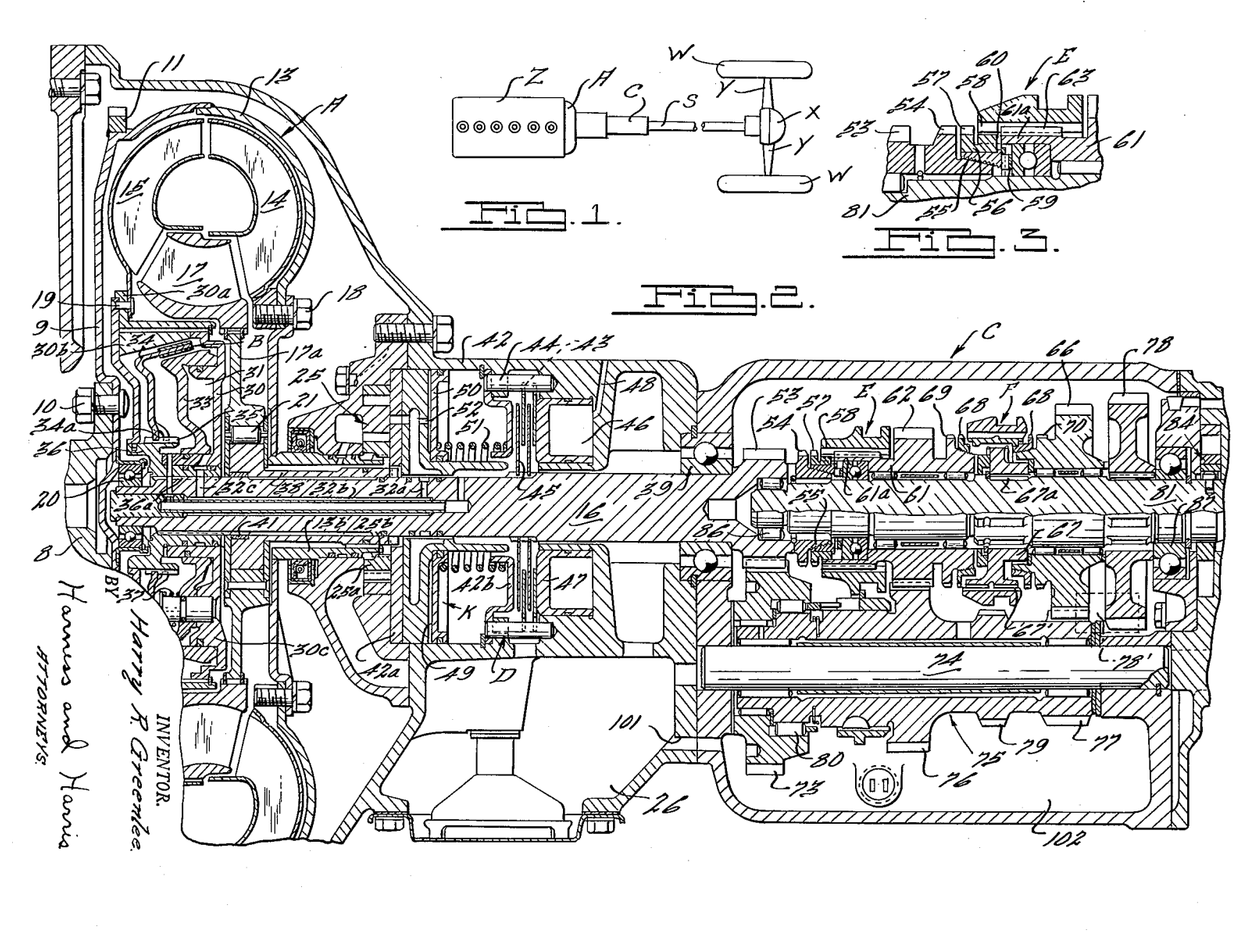
Fig. 1 is a schematic diagram of a motor vehicle drive train embodying this invention.
Fig. 2 is a sectional elevational view of the power transmission unit embodying this invention.
Fig. 3 is an enlarged fragmentary sectional elevational view of the shift sleeve arrangement employed in the change speed gear box of this power transmission unit.
Figure 3:
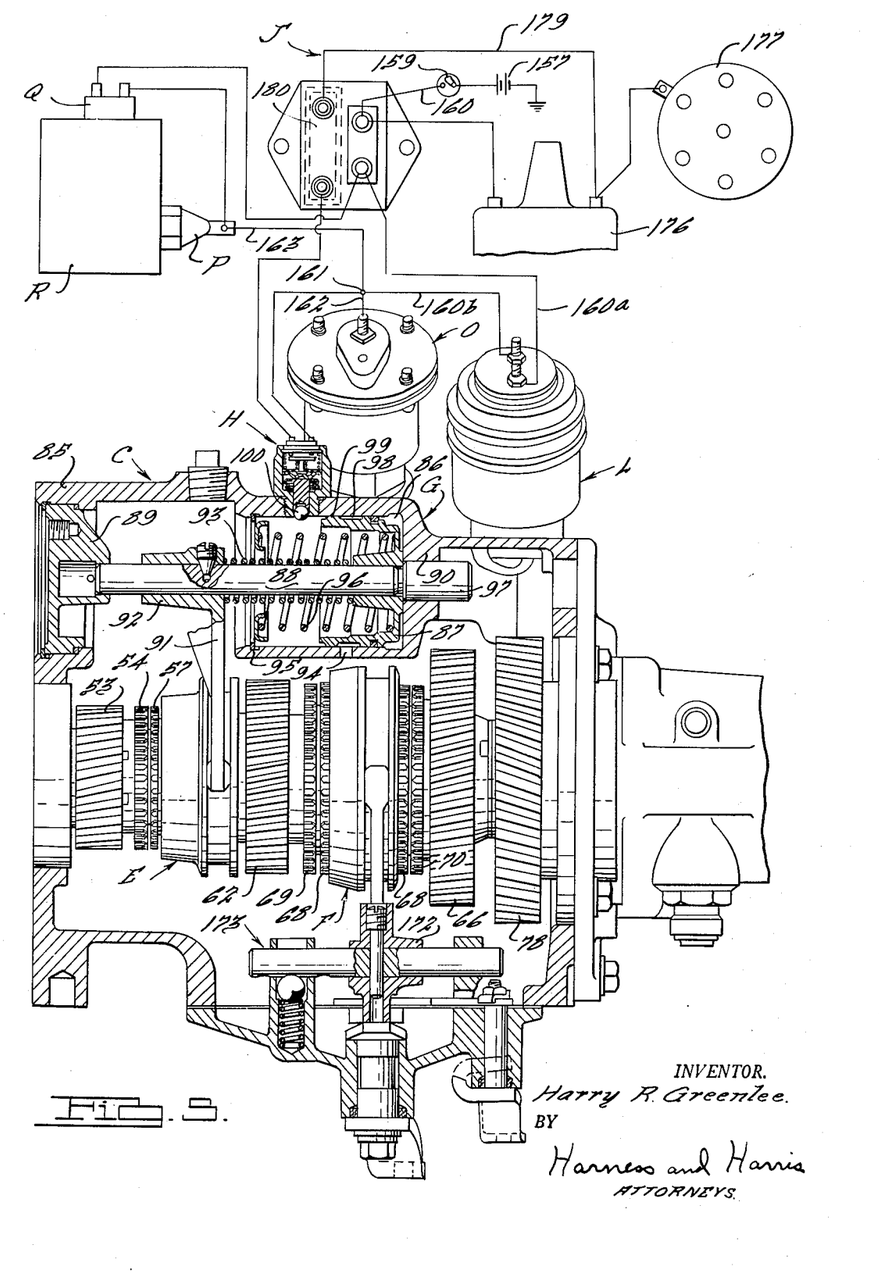

Fig. 1 diagrammatically discloses a conventional motor vehicle power plant and drive train comprising an internal combustion type of engine Z drivingly connected to a power transmission unit that consists of a hydrokinetic type of torque converter unit A and a change speed gear box C connected in series arranged drive transmitting relationship. The output from gear box C drives a propeller shaft or drive shaft S that transmits drive from the box C to the rear wheels W of the vehicle through the differential X and the rear driving axles Y.

Fig. 2 of the drawings clearly discloses that the hydrokinetic torque converter unit A and the change speed gear box C are arranged in a series drive transmitting relationship. The reference numeral 8 represents an end portion of a driving member, such as the crankshaft of the engine Z of the motor vehicle power unit. The shaft 8 is drivingly connected to the axially flexible drive transmitting plate 9 by the screw means 10. The drive transmitting plate 9 has an engine starter ring gear 11 fixedly mounted about its periphery. Drive transmitting plate 9 forms a part of the converter casing 13. Mounted within the torque converter casing 13 are the various converter rotor wheel components, namely, the impeller or pump member 14, the turbine or runner member 15, and the guide wheel, stator or reaction member 17. The vaned body portions of these rotor wheels are located radially outward from the axis of rotation of the wheels and the hub or web portions of the wheels provide a space within which a clutch mechanism B may be nested.

The vaned impeller wheel 14 is preferably detachably connected to the converter casing 13 by the screw means 18. Impeller wheel 14 is adapted to be directly driven by the driving shaft 8. The vaned turbine wheel 15 is drivingly connected by rivet means 19 to a radially extending flange portion 30a formed on the drum member 30 that is rotatably mounted on the forward end portion of the intermediate driven shaft member 16.

Drum member 30 (see Figs. 2 and 4) forms a part of the normally driving side of the master clutch unit B. Drum member 30 supports the clutch backing plate or ring 30b. Drum 30 has formed interiorly thereof a pressure fluid receiving cylinder 31. Pressure fluid may be introduced to cylinder 31 through the gallery composed of the bores 32a, 32b and 32c. Mounted within the drum cylinder 31, for axial reciprocation therein, is the pressure plate 33. Pressure plate 33 is adapted to be removed forwardly by the admission of pressure fluid to cylinder 31 to frictionally engage the cone-type clutch driven disc 34 with the backing plate 30b. Driven disc 34 is drivingly connected to the intermediate driven shaft 16 by the offset finger elements 34a that seat in the splineways 35 on the hub member 36. Hub 36 is drivingly connected to the shaft 16 through the splined connection 36a. Compression spring means 37, that extend between the flange 30c of drum member 30 and the pressure plate 33, normally urge the pressure plate 33 rearwardly to a clutch disengaged position.

Figures 4, 5:
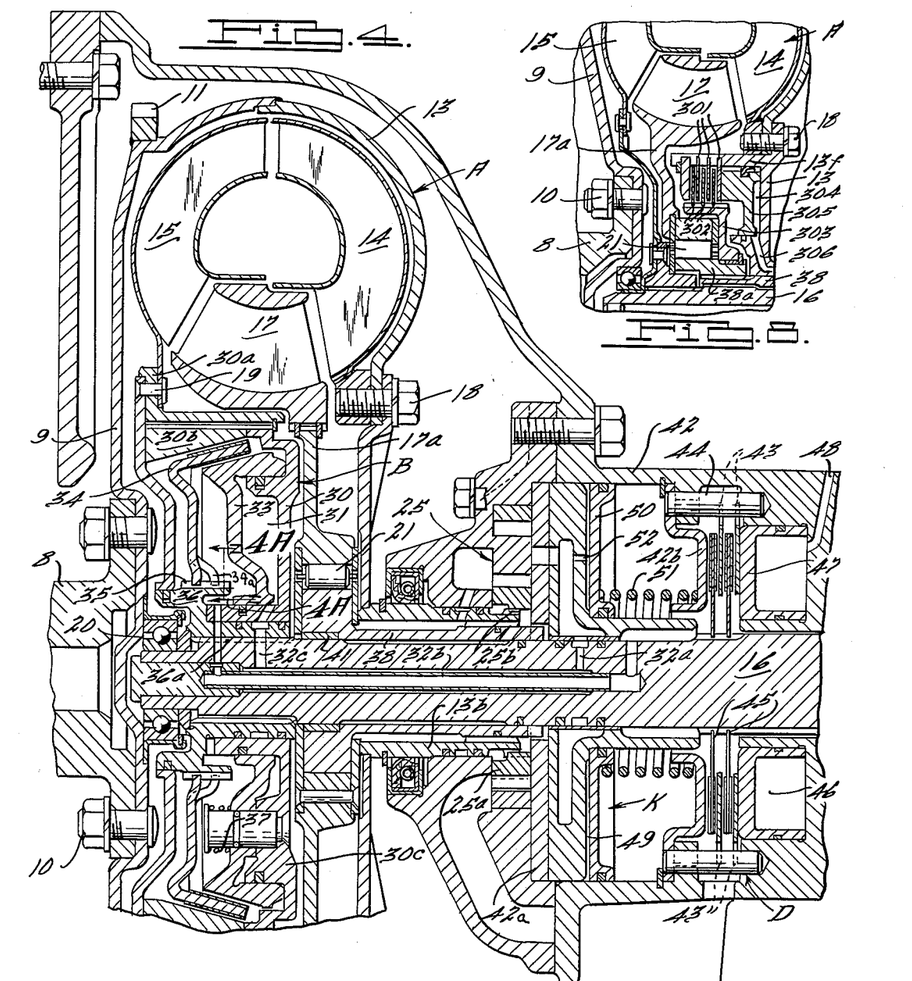
Fig. 4 is an enlarged fragmentary sectional elevational view of the torque converter and master clutch assembly employed with this power transmission unit.
Fig. 5 is a sectional elevational view of the gear box of this transmission unit with certain of the controls therefor shown in section and others shown diagrammatically.
Figure 4A:
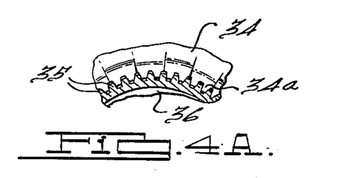
Fig. 4a is a fragmentary elevational view taken along the line 4a—4a of Fig. 4 disclosing the connection of the clutch disc to the driven shaft.

With the master clutch B herein disclosed it is thought to be obvious that drive will not be transmitted from the engine Z to the gear box C or propeller shaft S whenever clutch B is disengaged, for rotation of the turbine element 15 as a result of the rotation of impeller 14 by the engine driven shaft 8 will merely cause the clutch drum member 30 to rotate on the driven shaft hub element 36 due to the lack of a drive transmitting connection between turbine 15 and the hub 36 of the intermediate driven shaft 16. When clutch B is engaged then drum 30 is drivingly connected to the hub 36 of the shaft 16 through driven disc 34 and drive may then be transmitted from input shaft 8 to intermediate shaft 16 to gear box C and thence to output shaft 81 of gear box C if the gear box C is set for the transmission of drive.

It will be noted that master clutch B in this construction is nested within the hub or web portion of the torque converter A so as to consolidate the elements of the drive transmitting train and thereby reduce the overall length of the power transmission unit. In addition to reducing the overall length of the converter and master clutch assembly, this nested clutch arrangement provides for increased torque multiplication for a given converter rotational speed and this permits the use of smaller size rotor wheel blades to obtain a given torque multiplication. The blade elements of the several rotor wheels in this nested arrangement are spaced outwardly a greater radial distance from their rotational axis than is the case with a conventional converter unit. As a result of the increased effective radial dimension of the several rotor wheels, the torque multiplying capacity of the converter for any given rotational speed is greater than that of a similar conventional converter with the blade elements positioned closer to their axis of rotation. This results from the fact that the tangential velocities of the fluid in the converter are proportional to the effective radial dimensions of the rotor wheels. Accordingly, the nested converter and clutch unit provides a means whereby greater torque multiplying capacity may be achieved for any given converter rotational speed and rotor wheel blade design. The nested converter and clutch arrangement herein disclosed gives a slightly faster conversion of the torque multiplying ratio to a 1:1 drive transmitting ratio than a conventional converter unit having the rotor wheel blades located closer to the rotational axis. In a transmission using a gear ratio in series with the torque converter the effect of this somewhat faster reduction in torque multiplying capacity is taken advantage of for the gear ratio is still available for torque multiplication after the torque converter has changed to a 1:1 power transmitting unit. It also appears that this nested converter and master clutch assembly is quite advantageous if used with a torque converter driven transmission in which a turbo-reverse drive is obtainable. Due to the increased velocities of the fluid through the rotor wheel blades it is thought to be apparent that the turbo reverse drive will be greatly improved.

The intermediate shaft member 16, as previously stated, is adapted to transmit drive from the turbine member 15 of the torque converter unit A to the gear unit C. The forward end of intermedate shaft 16 is journaled in the bearing 20 that is mounted in the torque converter casing 13. The rear end portion of intermediate shaft 16 is rotatably supported by the bearing 39 carried by the housing 42.

The vaned reaction or guide wheel 17 of converter A is supported within the converter casing 13 by the guide wheel hub portions 17a. Guide wheel hub portion 17a is rotatably mounted, by means of a one-way brake device 21, on the forward end of the axially extending sleeve element 38. Sleeve element 38 is fixed to and projects from the wall 42a of the relatively stationary, housing 42. Bearing 41 supports the forward end of sleeve 38 on shaft 16. The one-way brake 21 is so arranged between guide wheel hub portion 17a and sleeve element 38 that it will permit only forward rotary movement (clockwise when looking from the converter A towards the gear box C) to be transmitted to the guide wheel 17 by the forward rotation of the impeller 14. The one-way brake 21 prevents rotation of the guide wheel 17 in a reverse or counterclockwise direction.

The torque converter unit A includes a gear type oil pump 25 having a driving gear 25a that is directly connected by the splined means 25b to the axially extending flange portion 13b of the rotatable converter casing 13. The pump 25 is adapted to draw oil from a sump 26 and circulates it through the converter unit A, the transmission lubricating system, and the various hydraulically operated control mechanisms associated with this transmission unit (see Figs. 5 and 6). A second pump 84, driven by the transmission output shaft 81, is also included in this transmission to provide a source of pressure fluid for the various hydraulically operated devices associated with the transmission unit at times when the engine driven pump 25 is not operating or is being purposely by-passed to reduce the engine load.

The intermediate driven shaft 16 of this transmission unit has associated therewith a no-creep brake device D that is automatically operable to prevent the transmission of drive between the torque converter A and the gear box C when the vehicle has been brought to rest with the engine idling and the transmission set for the transmission of drive. This no-creep brake device D is adapted to automatically anchor the shaft 16 against rotation when the engine accelerator control 275 is released to engine idle position and the vehicle speed is substantially zero. At this time the impeller 14 and turbine 15 slip relative to one another without transmitting drive to gear box C for turbine 15 is anchored against rotation by the application of brake D to shaft 16.

The no-creep brake device D includes the brake discs 43 that are anchored to the housing 42 by the studs 44. Brake discs 43 are adapted to be frictionally engaged with the brake discs 45 that are drivingly connected to the intermediate driven shaft 16. Engagement of the discs 43 and 45 is effected by admitting pressure fluid to the cylinder 46 so as to urge the axially shiftable piston 47 forwardly. Pressure fluid is transmitted to the cylinder 46 through the bore 48 in housing 42. Spring means or the like (not shown) normally urge the piston 47 rearwardly to brake disengaged position. The automatically operated control means for the no-creep brake device D are subsequently described in detail.

Also mounted in the housing 42 is a pressure fluid accumulator device K that is adapted to cushion the action of the hydraulically operated control mechanisms associated with this power transmission unit. The accumulator K provides a variable capacity pressure fluid storage unit to insure adequate pressure fluid for operation of all hydraulically actuated controls at all times and it also provides a resilient cushioning device to absorb impact loads and the like that develop in the closed hydraulic control system. The accumulator K comprises a cylinder 49, formed in housing 42, which cylinder is adapted to have reciprocably mounted therein the spring pressed piston element 50. Compression spring 51 extends between the flange-like partition 42b of housing 42 and the piston element 50 to resiliently control movement of the piston 50 axially of shaft 16. Spring 51 normally opposes rearward axial movement of the piston 50. The cylinder 49 is arranged to be supplied with pressure fluid from pump 25 through the supply port 52.

The illustrated change speed transmission gear box C is of the underdrive type although other types including overdrive transmissions of known commercial form may be employed if desired. This power transmission gear box C includes the input shaft 16 which carries the input pinion 53, the shift sleeve clutch teeth 54 and the synchronizer ring friction cone surface 55. The cone surface 55 (see Fig. 3 particularly) has rotatably mounted thereon the synchronizing blocker ring 56 which is formed with blocker teeth 57 adapted to be engaged by the internal teeth 58 of an axially shiftable clutch sleeve E. Sleeve E is adapted to be drivingly connected to the output shaft 81 by means that are subsequently described. This shift sleeve E and input shaft 16 comprise relatively rotatable members each of which is provided with engageable, toothed, drive control elements 58, 54 respectively for effecting step-up and step-down variation in the speed ratio drive to be transmitted by the power transmission unit C.

The output shaft 81 of gear box C, which has its forward end portion piloted at 86 in the rear end of input shaft 16, has its rear end portion rotatably supported by the transmission casing mounted bearing assembly 87. The output shaft 81 has rotatably mounted thereon a relatively high speed gear element 62. Also rotatably mounted on the output shaft 81 is a relatively low speed gear 66. A manually operable, axially shiftable, internally toothed, sleeve type clutch F is adapted to drivingly connect either of the gears 62 or 66 to the output shaft 81. The clutch sleeve F has its internal teeth or splines 67' slidably engaged with axially extending splineways or external teeth on the hub member 67. Hub member 67 is drivingly connected to the output shaft 81 by the splined connection 67a. The clutch sleeve F has associated therewith a pair of axially spaced, toothed, blocker synchronizing rings 68 similar to blocker ring 56 associated with sleeve E. The clutch sleeve F may be shifted either forwardly into engagement with the teeth 69 on gear 62 to establish a high range underdrive drive ratio or rearwardly into engagement with the teeth 70 on gear 66 to establish a low range underdrive drive ratio. The axial shift of sleeve F energizes the blocker rings 68 so as to synchronously clutch the internal teeth or splines 67' on sleeve F either with the high speed gear 62 through the gear teeth 69 or with the low speed gear 66 through the gear teeth 70. Manual shifts of clutch E are facilitated by release of the master clutch B through operation of the gear shift lever 72 (see Fig. 6) which operation is subsequently described in detail.

Input pinion 53 has constant mesh with a gear 73 that is rotatably supported by the countershaft 74. Countershaft gear 73 is drivingly connected through an overrunning clutch 80 to the countershaft gear cluster 75. Clutch 80 permits gear cluster 75 to overrun gear 73 in a forward direction. The gear cluster 75 comprises gears 76 and 77 respectively which are in constant mesh with gears 62 and 66 respectively. For reverse drive an axially shiftable idler gear 78' is provided. This idler gear 78' has constant mesh with gear 77 and is adapted to be shifted rearwardly in an axial direction to mesh with the reverse gear 78 that is drivingly fixed on output shaft 81. Clutch F is maintained in its illustrated neutral position when reverse drive is to be transmitted from input shaft 16 to output shaft 81.

Blocker ring 56 (see Fig. 3) is lightly urged against the cone 55 of input pinion 53 by an annular washer type spring 59 that extends between the forward end 61 of the hub of gear 62 and the blocker ring 56. Ring 56 has a lost-motion lug and slot connection at 60 with the circumferentially slotted forward end portion 61a of the hub 61 of the high speed gear 62 such that the blocker ring 56 may rotatably move relative to sleeve E between two positions blocking the forward shift of sleeve E. Such positions are known as the drive block and the coast block positions of the ring 56 depending on whether pinion 53 appreciably leads or lags the speed of the sleeve E. The sleeve E is splined on the gear hub 61 as shown at 63. The arrangement of the blocker ring 56 relative to the drive pinion teeth 54 and the teeth 58 of shift sleeve E is such that whenever sleeve E is rotating faster or slower than pinion 53 then the blocker ring teeth 57 will be aligned with the ends of the teeth 58 of sleeve E and thus prevent a complete forward shift of the sleeve E and the teeth 58 such that teeth 58 will be moved into drive transmitting engagement with drive pinion teeth 54. However, when the pinion 53 is rotating faster than sleeve E and gear 62, and the sleeve E is biased forwardly into the so-called drive blocked position, the driver may release the engine accelerator pedal 275 (see Fig. 6) or apply some other control element such as brake or the like so as to cause the speed of the driving engine and the drive pinion 53 to be slowed down. As the speed of the drive pinion 53 and shift sleeve E pass through a substantially synchronous speed relationship the blocker ring 56 is then moved by hydraulically operated means G (see Fig. 5) from its drive blocking position toward its coast blocking position and when substantially midway therebetween will unblock the shift sleeve teeth 58 and allow teeth 58 to move forwardly between the blocker teeth 57 and drivingly clutch with the drive pinion teeth 54.

When manually shiftable clutch F is shifted rearwardly to clutch gear 66 to shaft 81 then an overrunning relatively slow speed low range forward underdrive or first speed is transmitted from shaft 16 to shaft 81 by way of gears 53, 73 overrunning clutch 80, and gears 77 and 66. If at such time shift sleeve E should be biased forwardly into the drive block position and the shaft 16 then allowed to coast down by overrunning release of clutch 80, then when the speed of the rotating drive pinion teeth 54 is substantially synchronized with the speed of the teeth 58 of sleeve E, the latter teeth, as aforesaid, will be unblocked and will clutch with the drive pinion teeth 54 to effect a direct connection therebetween and bring about a step-up in the underdrive ratio. After engagement of teeth 54 and 58 a two-way, relatively fast speed, low range underdrive or second speed is transmitted from shaft 16 through shift sleeve E to gear 62 thence by way of gears 76, 77 and 66 and engaged clutch F to the output shaft 81, the clutch 80 overrunning during this drive.

If clutch F is initially shifted forwardly to clutch gear 62 to shaft 81 then an overrunning relatively slow speed high range underdrive or third speed is transmitted from shaft 16 to shaft 81 by way of gears 53, 73 overrunning clutch 80, gears 76 and 62 thence through engaged clutch F to output shaft 81. This is the normal forward starting underdrive ratio.

In the same manner as aforesaid in connection with the step-up from first to second speed, shift sleeve E may be subsequently clutched to input shaft 16 under coast synchronous speed conditions with pinion teeth 54 engaging sleeve teeth 58 to effect a two-way high range or direct fourth speed drive of a ratio of 1 to 1 from shaft 16 directly through shift sleeve E and engaged clutch F to shaft 81, clutch 80 overrunning during this drive.

If the clutch F is left in the neutral position shown in Fig. 2 and the axially shiftable idler gear 78' is shifted rearwardly by the control means 173 (Fig. 5) to meshingly connect gears 77 and 78, then a low speed reverse drive may be transmitted from shaft 16 through gears 53, 73, clutch 80, gear 77, idler gear 78' and gear 78 to the output shaft 81. Reverse drive is also adaped to be upshifted to a high speed reverse drive by forward shift of the automatically operated shift sleeve E.

A gear pump 84, drivingly connected to the output shaft 81, is provided to supply pressure fluid to the power transmission unit C and the other hydraulically operated devices whenever shaft 81 is rotating. This pump 84 will provide pressure fluid for the transmission C as well as the converter A and clutch B even when the engine Z is not operating (see Fig. 6). This arrangement is advantageous during a towed or pushed start.

The control system for the automatic operation of the gear box C will now be described. (See Figs. 5 and 6). Speed responsive governor means O, that may be driven from the countershaft cluster gear 79, is provided as one means to automatically control forward bias of sleeve E as well as rearward bias thereof as will presently be more apparent. Furthermore, during drive in either the upshifted second or fourth speed, a downshift or step-down to first or third speed respectively may also be manually effected by causing a rearward bias of sleeve E. This latter shift of sleeve E may be automatically effected with changes in vehicle speed or manually effected under control of the driver. This manual downshift may be accomplished by a full depression of the engine accelerator pedal 275, so as to operate a control system kickdown switch P which is also subsequently described.

Referring now to Fig. 5, I have illustrated servo-motor means in the form of a fluid motor or shift cylinder G for controlling shift of sleeve E. The motor G comprises a cylinder 86 that slidably receives a piston 87 which slidably receives a shift rod 88 that is mounted so as to reciprocate in the housing guideways 89, 90. Fixed to the piston shift rod 88 is the collar 92 of a yoke 91 that is connected with sleeve E to effect shift thereof. A relatively small force, pre-loaded, engaging spring 93 is threaded on rod 88 and is disposed between piston 87 and yoke 91 to provide a lost-motion thrust transmitting connection such that piston 87 may move forwardly or to the left relative to rod 88 during its power stroke. Forward movement of piston 87 is limited by relief ports 94 and abutment 95 in advance of the full clutching shift of sleeve E. On movement of piston 87 to the left the engaging spring 93 is compressed and this compressed spring 93 then urges the yoke collar 92 towards the left so that the teeth 58 of sleeve E are moved into engagement with teeth 57 of blocker 56, and, after coast, into engagement with the teeth 54 of pinion 53. The yoke collar 92 is arranged to abut against the exposed end of guideway 89 when the sleeve E has come to rest in its fully engaged, forward, upshifted position. A relatively large force, pre-loaded, kickdown spring 96 is disposed between abutment 95 and piston 87 and serves to normally return the piston 87 and sleeve E to the downshifted Fig. 5 position. The spring 96 is thus adapted to effect disengaging bias of sleeve E relative to pinion teeth 54.

Rod 88 has an enlarged end 97, the forward end of which is adapted to engage the head of piston 87 when the piston 87 is in its downshifted position but which, when the piston 87 and rod 88 are moved to the left to the end of their forward, upshifted strokes, is spaced rearwardly of the piston head to provide a gap equal to the difference in the strokes of the piston and rod. This gap is utilized to close an ignition control switch H that is provided for interrupting the engine ignition system J. Ignition interruption on downshift is advantageous for it momentarily relieves the torque between engaged teeth 54, 58 so that the kickdown spring 96 may then easily move the shift sleeve E rearwardly to its downshifted position. Piston 87 is formed with an annular groove 98 in its skirt portion to define the cam portion 99 which operates the ball actuator 100 for closing the contacts of the ignition interruption switch H.

The pressure fluid supply system for operation of the shift cylinder servo-motor G (see Fig. 6) comprises a suitable supply of oil which is usually at the transmission sump 102 or the sump 26. A bore 101 connects the sumps 102 and 26 so that each sump may feed the other. However, the location of the bore 101 is such as to normally maintain separate oil supplies in each sump 26 and 102. The pump 84 which is driven by the transmission output shaft 81, draws the oil from the supply sump 102 for delivery under pressure through conduit 111 to the cylinder 86 of servo motor shift cylinder G. An electrically operated control valve unit V (see Fig. 6) controls the passage of oil to the shift cylinder G. This valve is operated by the solenoid L. When the valve V is set so as to allow oil to be forced directly from the pump 84 into shift cylinder G, the pressurized oil in cylinder G moves the piston 87 and shift rod 88 to the left thus causing yoke 91 to shift sleeve E to the left and thereby condition the transmission unit C for the up-shift or step-up to second or fourth speed depending on whether clutch F is engaged with first speed gear 66 or third speed gear 62. When the solenoid L is energized so as to cause the control valve V to bleed off the supply of pressurized oil to the shift cylinder G then the piston return or kickdown spring 96 tends to drive the rod 88 to the right and to shift yoke 91 towards the right to the downshift position shown in Fig. 5. The control circuit for energization and de-energization of the solenoid L is such that the solenoid L is energized only in first and third speeds and consequently in second and fourth speeds, where most of the actual driving time is accumulated, the solenoid L is in a de-energized condition. This arrangement increases the life of the solenoid L and accordingly renders the system more economical than one where the solenoid L remains energized during the majority of the driving time.

Energization and de-energization of solenoid L is brought about by operation from one position to another of either of two control members N and P respectively which are respectively actuated or controlled by vehicle speed and by the driver. Electrical control circuit means for solenoid L (see Figs. 5 and 6) includes a grounded storage battery 157 for supply of electrical energy through an ignition switch 159 to a conductor 160, 160a thence through the solenoid L and conductor 160b to a terminal 161, whence either of two parallel conductors 162 or 163 will complete a circuit to ground at 164. A solenoid Q in parallel with the solenoid L controls an anti-stall mechanism associated with the carburetor R of the engine unit that drives the transmission unit C. As this mechanism is not directly associated with this invention it is not described. The conductor 162 has the switch N associated therewith and arranged such that it is automatically opened and closed by the operation of the speed controlled governor device O. The governor operated switch N constitutes one of the two aforesaid control members for solenoid L. Switch N is closed at relatively low vehicle speeds and is automatically opened at predetermined relatively high vehicle speeds by the governor O. When governor operated switch N is closed, the solenoid L is energized, valve V is open, and shift cylinder piston 87 is positioned in its downshifted condition as shown in Fig. 5.

Figures 6, 7:
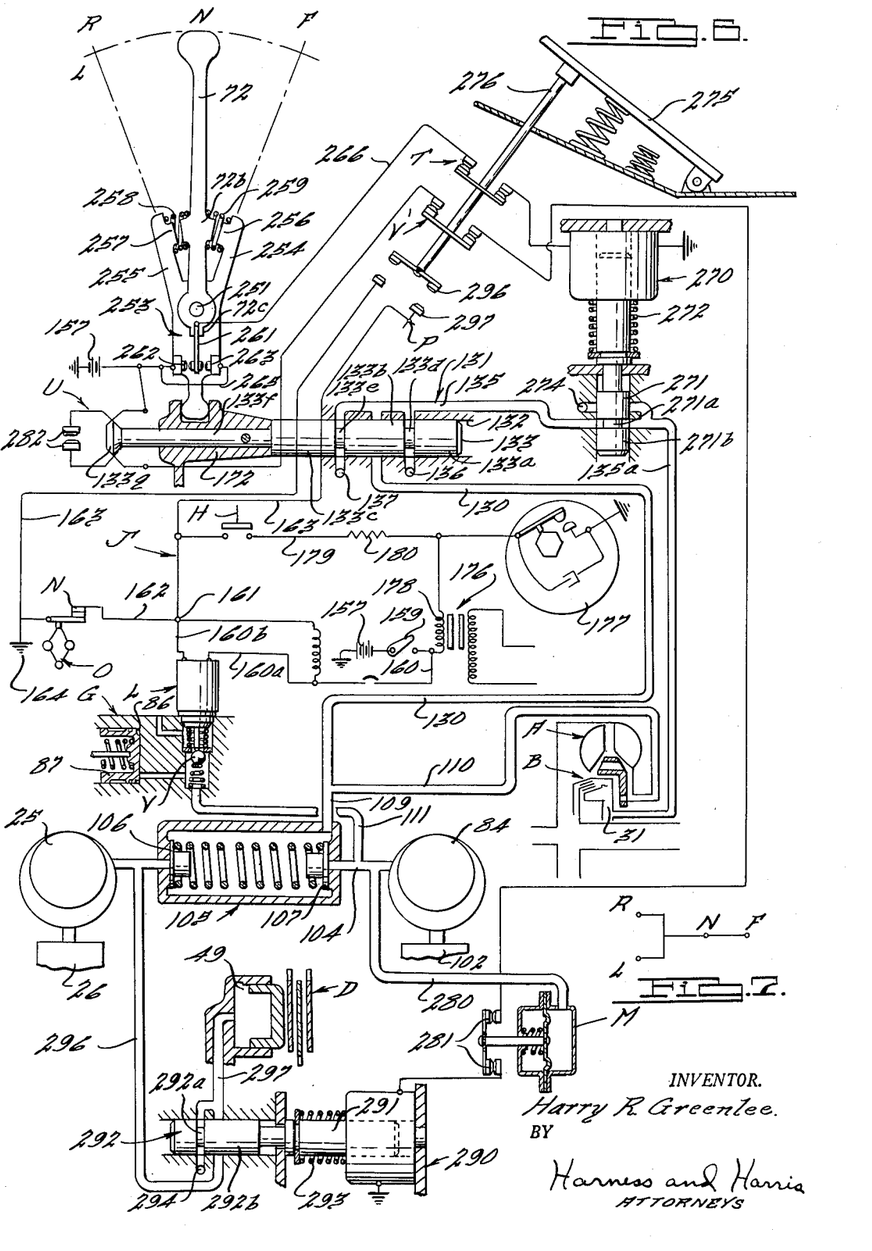
Fig. 6 is a diagrammatic sketch of the control system for the complete power transmission unit.
Fig. 7 is a diagrammatic sketch of the shift pattern for this power transmission unit gear ratio selector lever.

The other parallel circuit for energizing solenoid L, by grounding terminal 161 at 164 through conductor 163, is controlled by the manually operated accelerator pedal controlled kickdown switch P. Kickdown switch P is closed by a full depression of the engine accelerator control pedal 275. The manually operated accelerator pedal 275 thus constitutes the second of the two aforementioned control members for the solenoid L. Thus it will be seen that the governor O provides an automatically operable means for initiating shifts of the sleeve E whereas the accelerator pedal 275 provides a manually operable means for initiating shifts of the sleeve E.

The engine ignition system J associated with this transmission is more or less conventional and includes ignition coil 176, and the distributor 177. From the primary side 178 of the coil 176 an ignition interruption grounding line 179 extends through a resistance 180 to the ignition interrupter switch H and thence to ground at 164 through conductor 163 and kickdown switch P. It will be obvious from a study of this electrical circuit that ignition interruption can only occur when the circuit through the ignition interrupter switch H is closed.

The functioning of this transmission gear box C and its several controls is more specifically set forth in the copending application of Louis B. Forman, Serial No. 747,377, filed May 12, 1947, now U. S. Patent No. 2,513,791 dated July 4, 1950.

From Fig. 6 it will be noted that the fluid withdrawn from sump 26 by pump 25 or from sump 102 by pump 84 is adapted to be directed by the pressure fluid supply conduits 109, 110 to the converter unit A. Conduit 130 connects the supply conduit 109 to the supply for the master clutch unit B. Conduit 110 that connects the pressure fluid supply conduit 109 to the converter A may include a pressure regulator valve (not shown) to control the pressure of the fluid delivered to the converter A. Pressurized fluid directed to the converter A by conduit 110 is returned to the sump 26 by suitable conduit means (not shown) which may have suitable fluid cooling means and pressure regulator valving arranged in series therewith. This arrangement is more or less conventional and has not been shown as it forms no part of this invention.

Pressurized fluid from the supply conduit 109 is delivered by the conduit 130 to the control valve 131 for the master clutch unit B. Control valve 131 includes a cylinder bore 132 that has a spool-type valve 133 reciprocably mounted therein. Valve 133 has spaced lands 133a, 133b, and 133c connected by reduced neck portions 133d and 133e respectively. Projecting from the land 133c is a rod-like valve actuator element 133f which will be further described subsequently. With the valve 133 positioned as shown in Fig. 6 it is obvious that the valve land 133b closes off the pressure fluid inlet port to valve bore 132 from conduit 130 so as to prevent the admission of pressure fluid to conduits 135, 135a and into the clutch unit B to effect engagement of clutch B. Furthermore, when valve 133 is positioned as shown in Fig. 6, the pressure fluid that has been admitted to clutch B may drain out of the clutch cylinder 31 through conduits 135a, 135 and the drain bores 136 and 137. Spring 137 of clutch B normally urges the clutch piston 33 towards the right to its normal clutch disengaged position.

This invention also includes mechanism associated with the conventional gear ratio selector shift lever 72 in such a manner that the operation of master clutch B is substantially automatic, the mechanism providing means whereby the conventional foot operated clutch pedal may be completely eliminated from the vehicle controls. Gear ratio selector lever 72 is pivotally mounted on a suitable supporting member, preferably the vehicle steering post, so that it may swing in a normal manner about a point 251 as its axis of rotation. Lever 72 is connected through member 253 to yoke hub 172 which operates suitable shift rail mechanism, generally indicated at 173 in Fig. 5, to effect shift of the gear selector sleeve F and the reverse idler gear 78' whereby the power transmission unit C may be conditioned for either low range or high range forward drive, reverse drive or neutral. The position of the shift lever 72 for either of these transmission settings is indicated respectively by the letters L, F, R and N in Figs. 6 and 7. Also pivotally mounted to rotate about the axis 251 is the yoke member 253. Yoke member 253 has spaced apart jaws 254 and 255 that are positioned on opposite sides of the shift lever 72. Jaws 254 and 255 have projections 256 and 257 respectively that are adapted to engage the enlarged portion 72b of the shift lever 72 after a predetermined relative rotative movement between lever 72 and yoke 253. To normally center the lever 72 between the yoke jaws 254, 255, as shown in Fig. 6, there are provided a pair of compression springs 258, 259. The inner, rotatably mounted, end 72c of lever 72 carries a spring supported double contact electrical switch element 261. Contact member 261 is adapted to engage one or the other of the spaced apart, yoke supported, switch contacts 262 or 263 depending on the direction of rotational movement of the lever 72. The arrangement of the lever 72 and yoke 253 is such that initial movement of the shift lever 72 from its neutral position N towards either of its drive transmitting positions F, L or R respectively, engages the contact element 261 with either contact 262 or 263 and causes compression of one or the other of the spring elements 258 or 259. During this initial movement of lever 72 the springs 258 or 259 are compressed and the motion of shift lever 72 is not transmitted to yoke 253 therefore there is no actual movement of the yoke 253, the gear ratio selector sleeve hub 172 or the associated gearing. Following the making of contact between switch elements 261 and 262 or 263, the lever portion 72b will engage one or the other of the yoke projections 256 or 257 to thereby establish a connection that will effect shift of yoke 253 and hub element 172 to the selector drive transmitting position. During such shift of yoke 253 to a drive transmitting position, the contacts 261 and 262 or 263 remain engaged. When the lever 72 has been positioned in its selected drive transmitting position and the shift pressure released, then the spring 258, 259 will center the lever 72 with respect to the yoke jaws 254, 255 and this will break the contact between switch elements 261 and either 262 or 263.

The electrical system associated with the contacts 261, 262 and 263 comprises the grounded battery 157 which is connected to contacts 262 and 263 by suitable conductor means including the branch conductor 265. Contact element 261 is connected by conductor 266 to an accelerator pedal controlled switch T. Switch T is connected to the grounded solenoid 270. Solenoid 270 has the plunger element thereof formed with a spool type valve element 271 adapted to control the passage of pressure fluid through conduits 135, 135a. Valve 271 thereby controls engagement and disengagement of master clutch B. When solenoid 270 is deenergized then spring 272 positions plunger 271 in the extended position shown in Fig. 6 and the neck portion 271a permits the flow of pressure fluid between the valve 131 and the clutch B. When solenoid 270 is energized the plunger valve 271 is retracted by the solenoid 270 and neck portion 271a is aligned with the bleed port 274 so that clutch B then drains and disengages. The valve land portion 271b closes off the pressure fluid supply conduit 135 from the clutch B when solenoid 270 is energized.

Operation of the gear shift lever operated master clutch control mechanism is as follows:

With the gearshift lever positioned in the neutral position N, as shown in Fig. 6, the valve 133 is positioned so as to block off the supply of pressure fluid from supply conduit 130 to the clutch supply conduits 135, 135a and at this time the clutch cylinder 31 will drain through drain ports 136, 137 and clutch B will be maintained in a disengaged position. If shift lever 72 is moved to either the high range forward drive position F, the reverse drive position R or the low range forward drive position L, initial movement of the lever 72 closes contacts 261 and 262 or 263 prior to actual shift of the yoke 253 and movement of valve 133 and the associated gearshift control member 172. If at this time the accelerator pedal 275 is released to closed throttle engine idle position the switch T will be closed and the solenoid 270 will be energized for there will be a closed circuit through switch contacts 261, conductor 266, switch T and the solenoid 270. Energization of the solenoid 270 retracts plunger valve 271 to a position where the valve neck portion 271a is aligned with the drain conduit 274 so as to insure disengagement of clutch B and this permits ready manual shift of the shift sleeve F and the member 172 to either of its drive transmitting positions F, L or R. Upon completion of the movement of the shift lever 72 to either of the drive transmitting positions F, R or L and release of the lever 72, the positioning spring 258, 259 will then center lever 72 with respect to the yoke member, jaws 254, 255 and the contact 261 will be disengaged from either of the contacts 262 or 263. On the opening of switch contacts 261 and 262 or 263 the solenoid 270 will be deenergized and valve plunger 271 will be extended by spring 272 to the position shown in Fig. 6, such that pressure fluid in supply conduit 135 may then be directed to supply conduit 135a and into the cylinder 31 of the master clutch B. Admission of pressure fluid to master clutch cylinder 31 effects engagement of clutch B and conditions the power transmission unit from the transmission of the selected drive. It will be noted that as shift lever 72 is shifted to either of the drive transmitting positions F, R or L the clutch control valve 133 will also be shifted to a position to align the necked portions 133d or 133e with the connection between conduits 130 and 135 to thereby permit the transfer of pressure fluid to the clutch cylinder 31. On movement of the shift lever 72 from any of its drive transmitting positions F, R or L to any other position it will be noted that first the shift lever 72 rotates relative to the yoke member 253 so as to close contacts 261 and either 262 or 263. As the accelerator pedal is normally released when a shift is to be made it is thought to be obvious the clutch B will be disengaged prior to any shift of the shift lever from one position to another. Continued rotation of the shift lever 72 after lever portion 72b has engaged the yoke jaw portions 256 or 257 will thereafter cause shift of valve 133 and the yoke 172 of the shift sleeve control mechanism 173.

If while traveling in either of the upshifted forward drive ratios F or L it should be desirable to immediately accelerate in a more favorable gear ratio, then it is merely necessary to depress the foot accelerator 275 to its limit and this will engage the contacts 296, 297 of the kickdown shift P and effect a downshift in the speed ratio drive to a more favorable accelerating ratio. The opening of the contacts of switch T and V' during the kickdown has no effect whatever on the clutch control or no-creep brake device as these circuits are normally broken during drive of the vehicle in any of the drive transmitting ratios.

The controls for the no-creep brake device D (see Fig. 6) comprise the shift lever controlled switch U, the accelerator pedal controlled switch V' and the vehicle speed responsive, fluid pressure operated, switch M. The spring supported contacts 282 of the shift lever controlled switch U are closed at all times except when the shift lever is in the neutral position (as shown in Fig. 6). The contacts of switch V' are closed only when the accelerator pedal 275 is in closed throttle, engine idling position. The switch M has the contacts 281 thereof closed only when the vehicle is at rest or when the gear box output shaft 81 is rotating at a very low speed, such as a vehicle speed of 3 or 4 miles per hour or less. Under such conditions the fluid pressure in conduit 280, connected to the output of pump 84, is insufficient to open the contacts 281 of switch M. It will be noted that switches U, V' and M are in series with the solenoid 290 to cooperatively control energization of the solenoid 290. The reciprocable plunger 291 of solenoid 290 has a spool type valve 292 formed on the exposed end thereof. Spring 293 normally urges the valve 292 to the extended position shown in Fig. 6 where the necked portion 292a of valve 292 is aligned with the bleed conduit 294 for the no-creep brake cylinder 49. In such a position the valve land 292b blocks off the supply of pressure fluid to no-creep brake cylinder 49 from the front pump pressure fluid supply conduits 296, 297. Accordingly, when solenoid 290 is deenergized the no-creep brake D is not applied. When switches U, V' and M are all closed then solenoid 290 is energized and the solenoid valve necked portion 292a is aligned with the pressure fluid supply conduits 296 and 297 to permit pressure fluid to be directed into brake cylinder 49 to cause application of the no-creep brake D.

The operation of the no-creep brake device D is such that whenever the vehicle is substantially brought to rest so as to close the contacts 281 of switch M and the transmission is set for a drive transmitting ratio so as to close switch U, and the foot accelerator 275 is released to closed throttle position so as to close switch V', then the solenoid 290 will be energized and the valve 292 shifted so as to permit the admission of pressure fluid to the cylinder 49 of the no-creep brake D. At such a time the brake D will anchor the drive transmitting shaft against rotation and thereby prevent creep of the vehicle even though the engine is running and the transmission C set for a drive transmitting ratio. The brake D can only be applied when each of the three switches U, V' and M are simultaneously closed. Switch U will be closed whenever the shift lever is in a drive transmitting position. Switch M will be closed only when the vehicle speed is substantially zero. Switch V' will be closed only when the throttle has been closed by release of the accelerator pedal 275.

In normal operation the gear shift lever 72 is moved from the neutral position to the forward, high range, drive position and released. The accelerator 275 is then depressed and the vehicle is accelerated with a torque multiplication that is the product of the torque multiplication of the converter A (2.25) times the high range gear ratio (1.5) of the gear box C times the ratio (3.3) of the rear axle X. This will give a starting ratio of approximately 11.14. As the speed increases and the torque load diminishes, the accelerator pedal is momentarily released and the shift cylinder G then automatically upshifts the gear box C into the direct drive ratio. This upshift to direct in gear box C would normally occur when the vehicle speed is between 12–25 miles per hour. Thereafter, subsequent depression of the accelerator 275 drives the vehicle through the torque converter A and the direct drive connected gear box C, the torque converter A functioning as a simple fluid coupling during this drive and transmitting drive at a substantially 1:1 ratio.

A kickdown to third speed from the cruising direct drive is readily available for high speed acceleration. This downshift under manual control of the vehicle operator may be easily accomplished by a full depression of the accelerator pedal 275. Full depression of accelerator pedal 275 will bring about a shift of the shift sleeve E in gear box C to its third speed position. At this time the converter is normally operating as a fluid coupling and the kickdown is merely a change in ratios in the gear box C. This is important for the converter A then functions as a fluid coupling in absorbing shock that might otherwise be objectionable during such a downshift or change in gear ratio. The subsequent upshift to direct drive will be automatically accomplished in the usual manner.

In addition to the manually controlled downshift from direct drive to the third speed gear ratio it is thought to be obvious that there is an automatic downshift from direct drive to the third speed ratio whenever speed conditions of output shaft 81 are such as to effect such a downshift.

The manual shift from the cruising direct drive position F into the low range forward drive ratio L may be easily accomplished by merely moving shift lever 72 to the low range position L. This shift is advantageous when coast braking is desired or when abnormal torque is required for hard pulling.

The reverse and low positions of the shift lever 72 are shown in the same plane in Fig. 6 but from Fig. 7 it is obvious that one position is vertically spaced with respect to the other and that the shifts between these two positions will effect disengagement and reengagement of master clutch B. The conveniently adjacent positions of low and reverse are adapted to provide an easily operable means for rocking the motor vehicle between low and reverse to get out of holes, ruts or the like.

To provide pressurized oil for the operation of the converter A, clutch B and brake D when the engine is dead and a pushed or towed start is necessitated, the pressure fluid supply system has the rear output shaft driven pump 84 tied into the pressure fluid supply system associated with the front pump 25. (See Fig. 6.) Pump 84, which draws oil from the sump 102 of the gear box C and directs it to the shift cylinder G, has a branch conduit 104 that connects to a valve unit 105 which has a pair of check valves 106 and 107 therein. Valve 106 controls the output of pump 25 and valve 107 controls the output of pump 84. When pump 25 is not operating pump 84 will supply pressure fluid to conduits 110, 130 and 109 for operation of the torque converter A and the clutch B.

It is thought to be obvious that the power transmission unit herein disclosed is one that is substantially automatic in normal operation yet one that is under the complete control of the driver at all times so that the automatically selected gear ratio may be manually overruled if a more favorable gear ratio is desired. In addition to providing increased flexibility of operation, this power transmission unit provides increased smoothness in operation due to the association of the torque converter A with the change speed gear box C. As the torque converter A provides a portion of the torque multiplication for acceleration, the drive gear ratio of box C need not be as great as has heretofore been required and accordingly smoother, faster upshifts between third and fourth forward speeds are now obtainable. This results from the fact that the gear ratio for third speed in gear box C is reduced from approximately 1.8 to 1.5 so there is a smaller speed differential between input pinion 53 and gear 62 when the shift sleeve E is to be shifted between these two relatively rotatable gear elements. Accordingly, synchronization of the speeds of these two relatively rotatable elements can be accomplished more easily and with less time delay between shifts.

Another advantage of this transmission unit is that the conventional foot operated clutch pedal has been eliminated and the operation of the master clutch B is inherent in the shift of the gear selector lever 72. Control of the vehicle is thus improved and simplified for the only pedals that now need to be operated are the brake pedal and the accelerator pedal. Thus the vehicle driver has a foot available for operation of each of these pedals at all times.

In Fig. 8 is shown a modified form of nested torque converter and clutch assembly wherein a disc type clutch is nested within the central portion of the torque converter. In the Fig. 8 construction all parts that are similar to those in Figs. 1 and 4 carry the same reference numerals. The torque converter casing 13 in this instance has a flange portion 13f to which is drivingly connected a plurality of clutch discs 301. The hub portion 17a of the reaction or guide wheel member 17 is mounted on a one-way clutch 21 that is rotatably supported on the hub member 38a. Hub member 38a is splined to the sleeve member 38. In this modified form of the invention the sleeve member 38 is not intended to be rigidly connected to a stationary housing or the like as was the case with the Fig. 1 form of the invention but is intended to be connected to a rotatable member of a planetary gear set or the like. Also drivingly mounted on the hub member 38a is a spider element 303 which carries clutch discs 302 which are adapted to be drivingly engaged with the clutch discs 301. A pressure fluid cylinder 304 is carried by the converter casing member 13 and reciprocably mounted within the cylinder 304 is the axially movable piston 305. Pressure fluid from conduit 306 may be admitted to cylinder 304 to force piston 305 forwardly and cause engagement of the clutch discs 301 and 302. When discs 301 and 302 are drivingly engaged the impeller or pump member 14 of the torque converter and the support members 38, 38a for the reaction member 17 are connected together in a manner which permits the guide wheel member 17 to overrun the hub member 38a. The construction shown in Fig. 8 is particularly adapted for use with a transmission in which there is a two-path power flow input to an associated gear box. The nesting of the disc type clutch in Fig. 8 within the central portion of the torque converter A permits a consolidation of the elements of the drive transmitting train and also achieves the several advantages pointed out with regard to the torque multiplying capacity of the form of the invention shown in Figs. 2 and 4.

What is claimed is:

1. In a hydrodynamic power transmission unit, a driving shaft, a driven shaft, a fluid filled torque converter unit adapted to be drivingly connected between said shafts comprising an annular casing arranged concentrically about said driven shaft and having relatively rotatable, vaned, impeller, turbine, and reaction rotor wheels arranged within said casing so as to provide a closed, rotatable, fluid circuit, said wheels having the vaned portions thereof spaced radially outwardly from the axis of rotation of the driven shaft, means drivingly connecting said driving shaft and said impeller wheel, and a selectively engageable friction clutch device within said casing nested between the vaned portions of said wheels and said driven shaft and adapted to drivingly connect said turbine wheel and said driven shaft.

2. In a hydrodynamic power transmission unit, a driving shaft, a driven shaft, a fluid filled power transmitting unit adapted to be drivingly connected between said shafts comprising an annular casing arranged concentrically about said driven shaft and having relatively rotatable, vaned, impeller and turbine rotor wheels arranged within said casing so as to provide a closed, rotatable, fluid circuit, said wheels having the vaned portions thereof spaced radially outwardly from the axis of rotation of the driven shaft, means drivingly connecting said driving shaft and said impeller wheel, and a selectively engageable friction clutch device within said casing nested between the vaned portions of said wheels and said driven shaft and adapted to drivingly connect said turbine wheel and said driven shaft, said clutch device being aligned with said rotor wheels radially inwardly of said wheel vaned portions.

3. In a hydrodynamic power transmission unit, a driving shaft, a driven shaft, a fluid filled torque converter unit adapted to be drivingly connected between said shafts comprising relatively rotatable, vaned, impeller, turbine, and reaction rotor wheels arranged within a casing so as to provide a closed, rotatable, fluid circuit, said wheels having the vaned portions thereof spaced radially outwardly from the axis of rotation of the wheels, means drivingly connecting said driving shaft and said impeller wheel, and clutch means within said casing interiorly of said wheels and adapted to drivingly connect said turbine wheel and said driven shaft, said clutch means being nested within the web portion of said rotor wheels radially inwardly of said wheel vaned portions and comprising a drum member drivingly connected to said turbine wheel, a backing plate and a pressure plate mounted on said drum member and arranged for relative movement, a driven disc drivingly mounted on said driven shaft and arranged to have portions thereof clampingly engage between said backing plate and said pressure plate, and means associated with said pressure plate to effect movement thereof to cause the backing and pressure plates to drivingly engage the driven disc.

4. In a hydrodynamic power transmission unit, a driving shaft, a driven shaft, a fluid filled torque converter unit adapted to be drivingly connected between said shafts comprising relatively rotatable, vaned, impeller turbine, and reaction rotor wheels arranged within a casing so as to provide a closed, rotatable, fluid circuit, said wheels having the vaned portions thereof spaced radially outwardly from the axis of rotation of the wheels, means drivingly connecting said driving shaft and said impeller wheel, and clutch means within said casing interiorly of said wheels and adapted to drivingly connect said turbine wheel and said driven shaft, said clutch means being nested within the web portion of said rotor wheels radially inwardly of said wheel vaned portions and comprising an annular drum member drivingly connected to said turbine wheel and rotatably supported on said driven shaft, a backing plate member carried by said drum member, a cylinder formed in said drum member, a piston type pressure plate movably mounted in said cylinder, a clutch disc drivingly connected to said driven shaft and arranged with portions thereof between said backing plate and said pressure plate, and pressure fluid operated means associated with said cylinder adapted to effect actuation of said pressure plate to clampingly engage portions of said clutch disc between said backing plate and said pressure plate.

5. In a hydrodynamic power transmission unit, a driving shaft, a driven shaft, a fluid filled torque converter unit adapted to be drivingly connected between said shafts comprising relatively rotatable, vaned, impeller, turbine, and reaction rotor wheels arranged within a casing so as to provide a closed, rotatable, fluid circuit, said wheels having the vaned portions thereof spaced radially outwardly from the axis of rotation of the wheels, means drivingly connecting said driving shaft and said impeller wheel, and clutch means within said casing interiorly of said wheels and adapted to drivingly connect said turbine wheel and said driven shaft, said clutch means being nested within the web portion of said rotor wheels radially inwardly of said wheel vaned portions and comprising an annular drum member drivingly connected to said turbine wheel and rotatably supported on said driven shaft, a backing plate member carried by said drum member, a cylinder formed in said drum member, a piston type pressure plate movably mounted in said cylinder, a clutch disc drivingly connected to said driven shaft and arranged with portions thereof between said backing plate and said pressure plate, and pressure fluid operated means associated with said cylinder adapted to effect actuation of said pressure plate to clampingly engage portions of said clutch disc between said backing plate and said pressure plate and a pressure fluid accumulator mechanism connected to the pressure fluid operated clutch actuating means comprising a cylinder with a piston member reciprocably mounted therein and resilient means engaging said piston member and resiliently resisting movement thereof, said accumulator providing means to store pressure fluid for the actuation of the clutch and to absorb impact loads applied to said clutch.

6. In a power transmission unit including a driving shaft, a driven shaft, a fluid operated power transmitting device adapted to be drivingly connected between said shafts comprising relatively rotatable impeller and turbine wheels, means drivingly connecting said driving shaft to said impeller wheel, clutch means adapted to drivingly connect said turbine wheel and said driven shaft, pressure fluid operated means to effect operation of said clutch means, and a pressure fluid accumulator device connected to the pressure fluid clutch operating means comprising a closed chamber having a movable wall portion to vary the volume of said chamber, and resilient means supporting said movable wall and resisting movement of said wall to increase the volume of said chamber.

7. In a motor vehicle power transmission unit including an engine, a driving shaft connected to said engine, a driven shaft, a fluid operated power transmitting device adapted to be drivingly connected between said shafts comprising relatively rotatable impeller and turbine wheels, means drivingly connecting the driving shaft to the impeller wheel, and a pressure fluid operated brake means associated with said driven shaft adapted to anchor said driven shaft against rotation to prevent the transmission of drive between said driving and driven shafts, said brake means comprising braking elements mounted on a relatively stationary member, cooperating braking elements drivingly mounted on said driven shaft and adapted to be engaged with the braking elements on said stationary member, and control means associated with said braking elements adapted to effect engagement and disengagement thereof, said last mentioned control means including a driver operable engine control and an automatically operable control responsive to the speed of said driven shaft arranged to conjointly and automatically control operation of the brake means.

8. In a power transmission unit including an engine, a driving shaft connected to said engine, a driven shaft, a fluid operated power transmitting device adapted to be drivingly connected between said shafts comprising relatively rotatable impeller and turbine wheels, means drivingly connecting the driving shaft to the impeller wheel, and a pressure fluid operated brake means associated with said driven shaft adapted to anchor said driven shaft against rotation to prevent the transmission of drive between said driving and driven shafts, said brake means comprising braking elements mounted on a relatively stationary member, cooperating braking elements drivingly mounted on said driven shaft and adapted to be engaged with the braking elements on said stationary member, and control means associated with said braking elements adapted to effect engagement and disengagement thereof, said last mentioned control means including a driver operable control associated with said engine and an automatically operable driven shaft speed responsive control, said two last mentioned controls being arranged to conjointly and automatically control operation of the brake means.

9. In a motor vehicle provided with an engine and accelerator control therefor, a power transmission unit including a driving shaft, a driven shaft, a fluid operated power transmitting device adapted to be drivingly connected between said shafts comprising relatively rotatable impeller and turbine wheels, means drivingly connecting the driving shaft to the impeller wheel, and a pressure fluid operated brake means associated with said driven shaft adapted to anchor said driven shaft against rotation to prevent the transmission of drive between said driving and driven shafts, said brake means comprising braking elements mounted on a relatively stationary member, cooperating braking elements drivingly mounted on said driven shaft and adapted to be engaged with the braking elements on said stationary member, and electrically operated control means associated with said braking elements adapted to effect engagement and disengagement thereof, said last mentioned electrically operated control means including an accelerator operated control and an output shaft speed responsive control to conjointly and automatically control operation of the brake means.

10. In a motor vehicle provided with an engine accelerator and a speed ratio selector lever, a power transmission unit including a driving shaft, a driven shaft, a fluid operated power transmitting device adapted to be drivingly connected between said shafts comprising relatively rotatable impeller and turbine wheels, means drivingly connecting the driving shaft to the impeller wheel, and a pressure fluid operated brake means associated with said driven shaft adapted to anchor said driven shaft against rotation to prevent the transmission of drive between said driving and driven shafts, said brake means comprising braking elements mounted on a relatively stationary member, cooperating braking elements drivingly mounted on said driven shaft and adapted to be engaged with the braking elements on said stationary member, and electrically operated control means associated with said braking elements adapted to effect engagement and disengagement thereof, said last mentioned means comprising an accelerator operated control switch, an output shaft speed responsive control switch and a speed ratio lever operated control switch arranged in series to conjointly and automatically control operation of the brake means.

11. In a motor vehicle provided with an engine accelerator pedal, a fluid operated power transmitting device and a change speed gear unit, a manually operated drive ratio selector control, drive transmitting means connecting said fluid power transmitting device and said change speed gear unit, and brake means adapted to be applied to said drive transmitting means, a control system for said brake means comprising a pressure fluid operated means for actuating said brake means, and a control system for said pressure fluid operated means comprising a solenoid operated pressure fluid control valve and an electrical control system for said solenoid operated fluid pressure control valve comprising a drive ratio selector control operated switch adapted to be closed when said selector control is positioned so as to condition said change speed gear unit for the transmission of drive, an accelerator operated switch adapted to be closed when the accelerator is in engine idling position, and a vehicle speed responsive switch adapted to be closed when said vehicle speed is substantially zero.

12. In a motor vehicle provided with an engine accelerator pedal, a fluid operated power transmitting device and a change speed gear unit, a manually operated drive ratio selector control, drive transmitting means connecting said fluid power transmitting device and said change speed gear unit, and brake means adapted to be applied to said drive transmitting means, a control system for said brake means comprising a pressure fluid operated means for actuating said brake means, and a control system for said pressure fluid operated means comprising a solenoid operated pressure fluid control valve and an electrical control system for said solenoid operated fluid pressure control valve comprising a drive ratio selector control operated switch adapted to be closed when said selector control is positioned so as to condition said change speed gear unit for the transmission of drive, an accelerator operated switch adapted to be closed when the accelerator is in engine idling position, and a vehicle speed responsive switch adapted to be closed when said vehicle speed is substantially zero, said switches being arranged in series to conjointly control said brake means.

13. In a power transmission unit for a motor vehicle provided with an engine accelerator, a power transmission unit comprising an engine driven shaft, a fluid power transmitting device including relatively rotatable impeller and turbine members, means drivingly connecting the engine driven shaft and the impeller member, a change speed gear box adapted to be driven by said turbine member, said gear box including input and output shafts, gearing between said shafts, a manually operable speed ratio control member to selectively condition said gear box for the transmission of a plurality of different speed ratio drives, a power operated shiftable member associated with said gearing and adapted to be automatically engaged with different gearing components to alternately provide for the transmission of an underdrive speed ratio and a direct drive speed ratio, a clutch mechanism to drivingly connect the turbine member and the gear box input shaft, and a control system for said clutch mechanism comprising a first means adapted to be operated by said speed ratio control lever on initiation of movement of said control lever and a second means operated by said accelerator, said first and second means being arranged for conjoint control of the clutch mechanism.

14. In a power transmission unit for a motor vehicle provided with an engine accelerator, a power transmission unit comprising an engine driven shaft, a fluid power transmitting device including relatively rotatable impeller and turbine members, means drivingly connecting the engine driven shaft and the impeller member, a change speed gear box adapted to be driven by said turbine member, said gear box including input and output shafts, bearing between said shafts, a manually operable speed ratio control member to selectively condition said gear box for the transmission of a plurality of different speed ratio drives, a power operated shiftable member associated with said gearing and adapted to be automatically engaged with different gearing components to alternately provide for the transmission of an underdrive speed ratio and a direct drive speed ratio, a clutch mechanism to drivingly connect the turbine member and the gear box input shaft, and a control system for said clutch mechanism comprising power operated means to control engagement of said clutch mechanism including an electrically operated control system with a speed ratio control member operated switch mechanism and an accelerator operated switch mechanism arranged in series to conjointly control operation of the clutch mechanism.

15. In a power transmission unit for a motor vehicle provided with an engine accelerator, a power transmission unit comprising an engine driven shaft, a fluid power transmitting device including relatively rotatable impeller and turbine members, means drivingly connecting the engine driven shaft and the impeller member, a change speed gear box adapted to be driven by said turbine member, said gear box including input and output shafts, gearing between said shafts, a manually operable speed ratio control member to selectively condition said gear box for the transmission of a plurality of different speed ratio drives, a power operated shiftable member associated with said gearing and adapted to be automatically engaged with different gearing components to alternately provide for the transmission of an underdrive speed ratio and a direct drive speed ratio, a clutch mechanism to drivingly connect the turbine member and the gear box input shaft, and a control system for said clutch mechanism comprising a pressure fluid operated means for operating said clutch mechanism and a control system for said pressure fluid operated means comprising a speed ratio control member operated pressure fluid control valve and a solenoid operated pressure fluid control valve, said solenoid operated pressure fluid control valve having an electrical control circuit including a speed ratio control member operated switch, and an accelerator operated switch arranged in series to conjointly control operation of the solenoid operated pressure fluid control valve.

16. In a power transmission unit for a motor vehicle provided with an engine accelerator, a power transmission unit comprising an engine driven shaft, a fluid power transmitting device including relatively rotatable impeller and turbine members, means drivingly connecting the engine driven shaft and the impeller member, a change speed gear box adapted to be driven by said turbine member, said gear box including input and output shafts, gearing between said shafts, a manually operable speed ratio control member to selectively condition said gear box for the transmission of a plurality of different speed ratio drives, a power operated shiftable member associated with said gearing and adapted to be automatically engaged with different gearing components to alternately provide for the transmission of an underdrive speed ratio and a direct drive speed ratio, a clutch mechanism to drivingly connect the turbine member and the gear box input shaft, and a control system for said clutch mechanism comprising a pressure fluid operated means for operating said clutch mechanism and a control system for said pressure fluid operated means comprising a speed ratio control member operated pressure fluid control valve and a solenoid operated pressure fluid control valve, said solenoid operated pressure fluid control valve having an electrical control circuit including a speed ratio control member operated switch, and an accelerator operated switch arranged in series to conjointly control operation of the solenoid operated pressure fluid control valve, said speed ratio control member operated switch being associated with said speed ratio control member such that initiation of movement of said speed ratio control member closes said switch prior to actual movement of the speed ratio control member.

17. A power transmission unit comprising a driving shaft, a hydrokinetic torque converter including an impeller member, a turbine member, and a reaction member, means drivingly connecting the driving shaft and the impeller member, a change speed gear box arranged in series with said converter and adapted to be drivingly connected to said turbine member, said gear box including input and output shafts, gearing therebetween, a manually operable speed ratio selector lever to initially select the speed ratio drive of the gear box, and a power operated shiftable member adapted to be automatically engaged with different components of said gearing to vary the drive transmitting arrangement of said gearing so as to alternately effect the transmission of an underdrive speed ratio and a direct drive ratio between said input and output shafts, a clutch mechanism adapted to drivingly connect the turbine member and the input shaft, control means operable by said speed ratio selector lever to automatically effect engagement and disengagement of said clutch mechanism while manually effecting changes in the speed ratio drive, and output shaft speed responsive means and driver operable control means arranged to cooperatively and alternately control shift of said shiftable member independently of said clutch mechanism.

18. A power transmission unit comprising a driving shaft, a fluid operated power transmitting device including an impeller member and a turbine member, means drivingly connecting the driving shaft and the impeller member, a change speed gear box arranged in series with said fluid operated power transmitting device and adapted to be drivingly connected to said turbine member, said gear box including input and output shafts, gearing therebetween, a manually operable speed ratio selector lever to initially select the speed ratio drive of the gear box, and a power operated shiftable member adapted to be automatically engaged with different components of said gearing to vary the drive transmitting arrangement of said gearing so as to alternately effect the transmission of an underdrive speed ratio and a direct drive ratio between said input and output shafts, a clutch mechanism adapted to drivingly connect the turbine member and the input shaft, control means operable by said speed ratio selector lever to automatically effect engagement and disengagement of said clutch mechanism while manually effecting changes in the speed ratio drive, and output shaft responsive means and driver operable control means arranged to cooperatively and alternately control shift of said shiftable member independently of said clutch mechanism.

19. In a motor vehicle provided with an engine accelerator control, a power transmission unit comprising a driving shaft, a fluid operated power transmitting device including an impeller member and a turbine member, means drivingly connecting the driving shaft and the impeller member, a change speed gear box arranged in series with said fluid operated power transmitting device and adapted to be drivingly connected to said turbine member, said gear box including input and output shafts, gearing therebetween, a manually operable speed ratio selector lever to initially select the speed ratio drive of the gear box, and a power operated shiftable member adapted to be automatically engaged with different components of said gearing to vary the drive transmitting arrangement of said gearing so as to alternately effect the transmission of an underdrive speed ratio and a direct drive ratio between said input and output shafts, a clutch mechanism adapted to drivingly connect the turbine member and the input shaft, control means operable by said speed ratio selector lever to automatically effect engagement and disengagement of said clutch mechanism while manually effecting changes in the speed ratio drive.

20. In a motor vehicle provided with an engine accelerator control, a power transmission unit comprising a driving shaft, a fluid operated power transmitting device including an impeller member and a turbine member, means drivingly connecting the driving shaft and the impeller member, a change speed gear box arranged in series with said fluid operated power transmitting device and adapted to be drivingly connected to said turbine member, said gear box including input and output shafts, gearing therebetween, a manually operable speed ratio selector lever to initially select the speed ratio drive of the gear box, and a power operated shiftable member adapted to be automatically engaged with different components of said gearing to vary the drive transmitting arrangement of said gearing so as to alternately effect the transmission of an underdrive speed ratio and a direct drive ratio between said input and output shafts, a clutch mechanism adapted to drivingly connect the turbine member and the input shaft, control means operable by said speed ratio selector lever to automatically effect engagement and disengagement of said clutch mechanism while manually effecting changes in the speed ratio drive comprising pressure fluid operated means to actuate said clutch mechanism, a solenoid operated pressure fluid control valve and an electrical control circuit for said solenoid operated control valve comprising a speed ratio selector lever operated switch and an accelerator operated switch arranged in series with the solenoid operated pressure fluid control valve.

21. In a motor vehicle provided with an engine accelerator control, a power transmission unit comprising a driving shaft, a fluid operated power transmitting device including an impeller member and a turbine member, means drivingly connecting the driving shaft and the impeller member, a change speed gear box arranged in series with said fluid operated power transmitting device and adapted to be drivingly connected to said turbine member, said gear box including input and output shafts, gearing therebetween, a manually operable speed ratio selector lever to initially select the speed ratio drive of the gear box, and a power operated shiftable member adapted to be automatically engaged with different components of said gearing to vary the drive transmitting arrangement of said gearing so as to alternately effect the transmission of an underdrive speed ratio and a direct drive ratio between said input and output shafts, a clutch mechanism adapted to drivingly connect the turbine member and the input shaft, control means operable by said speed ratio selector lever to automatically effect engagement and disengagement of said clutch mechanism while manually effecting changes in the speed ratio drive comprising pressure fluid operated means to actuate said clutch mechanism, a solenoid operated pressure fluid control valve and an electrical control circuit for said solenoid operated control valve comprising a speed ratio selector lever operated switch and an accelerator operated switch arranged in series with the solenoid operated pressure fluid control valve, and a speed ratio selector lever operated pressure fluid control valve arranged in series with said solenoid operated pressure fluid control valve.

22. In a power transmission unit for a motor vehicle provided with an engine accelerator, a power transmission unit comprising an engine driven shaft, a fluid power transmitting device including relatively rotatable impeller and turbine members, means drivingly connecting the engine driven shaft and the impeller member, a change speed gear box adapted to be driven by said turbine member, said gear box including input and output shafts and gearing connectible between said shafts to provide for the transmission of a plurality of different speed ratio drives, a manually operable speed ratio control member to selectively condition said gearing for the transmission of the plurality of different speed ratio drives, said control member having a lost motion connection to said gearing, a clutch mechanism to drivingly connect the turbine member and the gear box input shaft, and an electrically operated control circuit for said clutch mechanism comprising a switch element carried by said speed ratio control member and adapted to be connected to the control circuit by initial actuation of said control member prior to the transmission of movement to said gearing from said control member, and an accelerator operated switch element arranged in said control circuit so as to be closed at closed throttle position of the accelerator.

23. In a power transmission unit for a motor vehicle provided with an engine accelerator, a power transmission unit comprising an engine driven shaft, a fluid power transmitting device including relatively rotatable impeller and turbine members, means drivingly connecting the engine driven shaft and the impeller member, a change speed gear box adapted to be driven by said turbine member, said gear box including input and output shafts and gearing connectible between said shafts to provide for the transmission of a plurality of different speed ratio drives, a manually operable speed ratio control member to selectively condition said gearing for the transmission of the plurality of different speed ratio drives, said control member having a lost motion connection to said gearing, a clutch mechanism to drivingly connect the turbine member and the gear box input shaft, and an electrically operated control circuit for said clutch mechanism comprising a switch element carried by said speed ratio control member and adapted to be connected to the control circuit by initial actuation of said control member prior to the transmission of movement to said gearing from said control member, said speed ratio control member including resilient means normally urging said switch element to an open circuit position, and an accelerator operated switch arranged in said control circuit so as to be closed at closed throttle position of the accelerator.

24. In a power transmission unit for a motor vehicle provided with an engine accelerator, a power transmission unit comprising an engine driven shaft, a fluid power transmitting device including relatively rotatable impeller and turbine members, means drivingly connecting the engine driven shaft and the impeller member, a change speed gear box adapted to be driven by said turbine member, said gear box including input and output shafts and gearing connectible between said shafts to provide for the transmission of a plurality of different speed ratio drives, a manually operable speed ratio control member to selectively condition said gearing for the transmission of the plurality of different speed ratio drives, said control member having a lost motion connection to said gearing, a clutch mechanism to drivingly connect the turbine member and the gear box input shaft, pressure fluid operated means to operate said clutch mechanism comprising a first pressure fluid control valve operable by said speed ratio control member and a second pressure fluid control valve arranged in series with said first valve adapted to be operated by a solenoid, and an electrical control circuit for the solenoid comprising a switch element carried by said speed ratio control member and adapted to be connected to the control circuit by initial actuation of said control member prior to the transmission of movement to said gearing from said control member, and an accelerator operated switch element arranged in said control circuit so as to be closed at closed throttle position of the accelerator.

25. In a power transmission unit for a motor vehicle having an engine provided with an accelerator control, a fluid operated power transmission including relatively rotatable impeller and runner wheels, means drivingly connecting the impeller wheel to said engine, a change speed gear type power transmitting device including input and output shafts, variable speed gearing connectible between said shafts, a manually operable gear ratio selector lever to initially select the speed ratio drive transmittable by the gearing, a power actuated, automatically operable shiftable member associated with said gearing and adapted to be power shifted between a pair of positions to provide for the transmission of an underdrive speed ratio and a direct drive speed ratio between said shafts, clutch means to drivingly connect said runner wheel to said input shaft, pressure fluid operated means to effect shift of said shiftable member, means responsive to the speed of said output shaft to automatically condition said shiftable member for an upshift from the underdrive ratio to the direct drive ratio and to automatically effect the downshift from direct drive to the underdrive speed ratio, accelerator controlled means to effect completion of the upshift to direct drive, pressure fluid operated means to operate said clutch, and control means for the clutch operating pressure fluid means comprising a control valve operable by said gear ratio selector lever and a control valve conjointly controlled by said gear ratio selector lever and said accelerator.

References Cited in the file of this patent

UNITED STATES PATENTS

| | | |
|---|---|---|
| Re. 20,989 | Wemp | Jan. 24, 1939 |
| Re. 22,967 | Nutt et al. | Jan. 27, 1948 |
| 1,888,779 | Tower | Nov. 22, 1932 |
| 2,102,755 | Sinclair | Dec. 21, 1937 |
| 2,252,042 | Sinclair | Aug. 12, 1941 |
| 2,353,137 | Banker | July 11, 1944 |
| 2,595,969 | McFarland | May 6, 1952 |